United States Patent
Liang et al.

(10) Patent No.: US 11,539,050 B2
(45) Date of Patent: Dec. 27, 2022

(54) CURRENT COLLECTOR, ELECTRODE PLATE AND BATTERY CONTAINING THE SAME, AND APPLICATION THEREOF

(71) Applicant: CONTEMPORARY AMPEREX TECHNOLOGY CO., LIMITED, Ningde (CN)

(72) Inventors: Chengdu Liang, Ningde (CN); Huafeng Huang, Ningde (CN); Qisen Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 209 days.

(21) Appl. No.: 15/827,214

(22) Filed: Nov. 30, 2017

(65) Prior Publication Data

US 2018/0198132 A1 Jul. 12, 2018

Related U.S. Application Data

(63) Continuation of application No. PCT/CN2017/081904, filed on Apr. 25, 2017.

(30) Foreign Application Priority Data

Jan. 12, 2017 (CN) .......................... 201710022284.8

(51) Int. Cl.
*H01M 4/66* (2006.01)
*H01M 10/052* (2010.01)
(Continued)

(52) U.S. Cl.
CPC ........... *H01M 4/668* (2013.01); *H01M 4/661* (2013.01); *H01M 4/663* (2013.01); *H01M 4/64* (2013.01);
(Continued)

(58) Field of Classification Search
CPC ........ H01M 4/668; H01M 4/667; H01M 4/64; H01M 4/665; H01M 10/052; H01M 10/0525
See application file for complete search history.

(56) References Cited

U.S. PATENT DOCUMENTS

| | | | | |
|---|---|---|---|---|
| 2006/0105243 | A1* | 5/2006 | Okamura | ................ H01M 4/64 |
| | | | | 429/234 |
| 2006/0216589 | A1* | 9/2006 | Krasnov | ............. H01M 2/0469 |
| | | | | 429/175 |

(Continued)

FOREIGN PATENT DOCUMENTS

| | | |
|---|---|---|
| CN | 1969412 A | 5/2007 |
| CN | 101071860 A | 11/2007 |

(Continued)

OTHER PUBLICATIONS

Japanese Office Action dated Aug. 31, 2017 for corresponding Japanese Application No. 2017-135550.

(Continued)

*Primary Examiner* — Jeremiah R Smith
(74) *Attorney, Agent, or Firm* — Ladas & Parry LLP

(57) ABSTRACT

Provided are a current collector, an electrode plate, a battery and an application of the current collector. The current collector includes an insulation layer and a conductive layer. The insulation layer is configured to bear the conductive layer, the conductive layer is configured to bear an electrode active material layer. A room temperature film resistance $R_S$ of the conductive layer meets a conditional expression: $0.016\Omega/\square \leq R_S \leq 420\Omega/\square$. By the current collector of the present application, the short circuit resistance of the battery in case of an abnormal situation causing the short circuit can be greatly increased, and the short circuit current can be greatly reduced. Thus, influence of the short circuit damage on the battery is limited to a point range, and an interrupt in (Continued)

the current only occurs in a point range, without disrupting normal operation of the battery in a certain period time.

10 Claims, 4 Drawing Sheets

(51) Int. Cl.
  *H01M 4/64* (2006.01)
  *H01M 10/0525* (2010.01)
(52) U.S. Cl.
  CPC .......... *H01M 4/667* (2013.01); *H01M 10/052* (2013.01); *H01M 10/0525* (2013.01)

(56) References Cited

U.S. PATENT DOCUMENTS

| | | | |
|---|---|---|---|
| 2007/0218333 A1 | 9/2007 | Iwamoto | |
| 2009/0202907 A1* | 8/2009 | Muraoka | H01M 4/622 |
| | | | 429/217 |
| 2010/0015514 A1* | 1/2010 | Miyagi | H01M 4/1391 |
| | | | 429/129 |
| 2012/0052378 A1* | 3/2012 | Torata | H01M 4/13 |
| | | | 429/209 |
| 2013/0309527 A1* | 11/2013 | Liu | B44C 1/22 |
| | | | 429/7 |
| 2014/0329126 A1* | 11/2014 | Ho | H01M 4/364 |
| | | | 429/128 |
| 2015/0311563 A1* | 10/2015 | Abe | H01M 10/0525 |
| | | | 429/332 |
| 2015/0318555 A1* | 11/2015 | Oku | B32B 27/365 |
| | | | 429/245 |
| 2015/0349346 A1* | 12/2015 | Yushin | H01M 4/386 |
| | | | 429/231.95 |
| 2016/0276668 A1* | 9/2016 | Nagayama | H01M 4/133 |
| 2017/0279113 A1* | 9/2017 | Ohsawa | H01M 2/22 |

FOREIGN PATENT DOCUMENTS

| | | |
|---|---|---|
| CN | 103966907 A | 8/2014 |
| JP | 05-205746 A | 8/1993 |
| JP | 09-120818 A | 5/1997 |
| JP | 09-120842 A | 5/1997 |
| JP | 11-67221 A | 3/1999 |
| JP | 11086868 A | 3/1999 |
| JP | 2003-282064 A | 10/2003 |
| JP | 2005-019312 A | 1/2005 |
| JP | 2011-243311 A | 12/2011 |
| JP | 2012-129114 A | 7/2012 |

OTHER PUBLICATIONS

International Search Report dated Oct. 13, 2017 from International Application No. PCT/CN2017/081904.
Extended European Search Report dated Aug. 16, 2018 for corresponding European Application No. 17803765.1.
Decision to Grant a Patent dated Sep. 27, 2018 for corresponding Japanese Application No. 2017-135550.
Chinese Office Action dated Apr. 22, 2019 for corresponding Chinese Application No. 201710022284.8.
Maryniak et al., "Surface Resistivity and Surface Resistance Measurements Using a Concentric Ring Probe Technique", Trek Application Note, No. 1005, 2013, pp. 1-4.

* cited by examiner

CURRENT COLLECTOR, ELECTRODE PLATE AND BATTERY CONTAINING THE SAME, AND APPLICATION THEREOF

CROSS-REFERENCE TO RELATED APPLICATIONS

The present application is a continuation of International Application No. PCT/CN2017/081904, filed on Apr. 25, 2017, which claims priority to Chinese Patent Application No. 201710022284.8, filed on Jan. 12, 2017, the contents of which are incorporated herein by reference in their entireties.

TECHNICAL FIELD

The present application relates to the field of batteries and, specifically, relates to a current collector, an electrode plate and a battery containing the current collector, and an application of the current collector.

BACKGROUND

A Li-ion battery has advantages of great energy density, high output power, long cycle life and little environmental pollution, so that the Li-ion battery is widely used in electrical vehicles and consumer electronics. However, fire and explosion can easily occur when the Li-ion battery falls into abnormal circumstances, such as squeezing, collision, and penetration, which may cause serious damages. Therefore, safety problems of the Li-ion battery limit its usage and popularity greatly.

A large number of experimental results show that, the short circuit in the battery is the root cause of the safety problem. In order to avoid the short circuit in the battery, researchers have been trying to improve a separator structure and a mechanical structure of the battery. In some researches, the way to improve the safety performance of the battery is to improve a design of the current collector.

When the Li-ion battery falls into abnormal situations, such as squeezing, collision, and penetration, a temperature of the Li-ion battery increases. In prior art, alloy with a low melting point is added into a metal current collector, so that as the battery temperature increases, the alloy with a low melting point of the current collector melts, which then cut off the current of the electrode plate, thereby improving the safety performance of the battery. Or, a multi-layer current collector with two metal layers and a resin layer sandwiched between the two metal layers is used, so that as the temperature increases to a melting point of the resin layer, the resin layer melts to break the electrode plate and cut off current, thereby improving the safety performance of the battery.

However, the short circuit in the Li-ion battery can't be effectively avoided by those methods in prior art, and there is no guarantee that the Li-battery can continue work after the abnormal situation occurs. In above-mentioned improvement methods, when internal short circuit occurs in the battery, the temperature of the battery increases rapidly. In that case, if a safety member can't respond rapidly, varying degrees of danger may occur. In addition, in the above-mentioned improvement methods, after the safety member responds, the potential safety problems of the battery are solved, but the battery can't work continually.

Therefore, it's necessary to provide a current collector and a battery, in which accidents, such as fire and explosion, caused by the short circuit, can be avoided in abnormal situations, and which can normally work after the abnormal situations.

SUMMARY

A first purpose of the present application is to provide a current collector.

A second purpose of the present application is to provide an electrode plate using the current collector of the present application.

A third purpose of the present application is to provide a battery using the electrode plate of the present application.

A fourth purpose of the present invention is to provide an application of the current collector.

To achieve the purposes of the present application, technical solutions are used as follows:

A current collector includes an insulation layer and a conductive layer, the insulation layer is configured to bear the conductive layer, the conductive layer is configured to bear an electrode active material layer, and the conductive layer is placed on at least one surface of the insulation layer, and a room temperature film resistance $R_S$ of the conductive layer meets a conditional expression: $0.016\Omega/\square \leq R_S \leq 420\Omega/\square$.

Preferably, the room temperature film resistance $R_S$ meets a conditional expression: $0.032\Omega/\square \leq R_S \leq 21\Omega/\square$, and preferably, $0.080\Omega/\square \leq R_S \leq 8.4\Omega/\square$.

Preferably, a thickness of the conductive layer refers to D2, D2 meets a conditional expression: $1\text{ nm} \leq D2 \leq 1\text{ }\mu\text{m}$;
preferably, $20\text{ nm} \leq D2 \leq 500\text{ nm}$, and
more preferably, $50\text{ nm} \leq D2 \leq 200\text{ nm}$.

Preferably, a thickness of the insulation layer is D1, and D1 meets a conditional expression: $1\text{ }\mu\text{m} \leq D1 \leq 50\text{ }\mu\text{m}$;
preferably, $2\text{ }\mu\text{m} \leq D1 \leq 30\text{ }\mu\text{m}$, and
more preferably, $5\text{ }\mu\text{m} \leq D1 \leq 20\text{ }\mu\text{m}$.

Preferably, the conductive layer is made of a material selected from a group consisting of metal conductive material, carbon-based conductive material and combinations thereof;

preferably, the metal conductive material is selected from a group consisting of aluminum, copper, nickel, titanium, silver, nickel-copper alloy, aluminum-zirconium alloy and combinations thereof; and preferably, the carbon-based conductive material is preferably selected from a group consisting of graphite, acetylene black, graphene, carbon nanotube and combinations thereof.

Preferably, the insulation layer is made of a material selected from a group consisting of organic polymer insulation material, inorganic insulation material, composite material and combinations thereof;

preferably, the organic polymer insulation material is selected from a group consisting of polyamide, polyethylene terephthalate, polyimide, polyethylene, polypropylene, polystyrene, polyvinyl chloride, acrylonitrile butadiene styrene copolymers, polybutylene terephthalate, poly-p-phenylene terephthamide, polyphenylene ether, polyformaldehyde, epoxy resin, phenol-formaldehyde resin, polytetrafluoroethylene, polyvinylidene fluoride, silicone rubber, polycarbonate and combinations thereof;

preferably, the inorganic insulation material is preferably selected from a group consisting of aluminum oxide, silicon carbide, silicon dioxide and combinations thereof; and preferably, the composite material is preferably selected from a group consisting of epoxy resin fiberglass reinforced composite, polyester resin fiberglass reinforced composite and combinations thereof.

Preferably, a hole is defined in the conductive layer, or a through hole is defined in the current collector penetrating through the insulation layer and the conductive layer.

Preferably, a method for forming the conductive layer on the insulation layer is selected from a group consisting of a mechanical rolling method, an adhesive bonding method, a vapor deposition method, an electroless plating method and combinations thereof.

Preferably, the vapor deposition method is preferably a physical vapor deposition method;

the physical vapor deposition method is preferably selected from a group consisting of a evaporation method, a sputtering method and combinations thereof, the evaporation method is preferably selected from a group consisting of a vacuum evaporating method, a thermal evaporation deposition method, an electron beam evaporation method and combinations thereof, and the sputtering method is preferably a magnetron sputtering method.

The present application further relates to an electrode plate. The electrode plate includes the current collector as described in any of the above paragraphs and an electrode active material layer formed on a surface of the current collector.

The present application further relates to a battery. The battery includes a positive electrode plate, a separator, and a negative electrode plate, and the positive electrode plate and/or the negative electrode plate is the electrode plate of the present application.

Preferably, an internal resistance of the battery is referred to as r, a capacity of the battery is referred to as Cap, a relation between r and Cap meets a conditional expression:

$$40\ Ah \cdot m\Omega \leq r \times Cap \leq 2000\ Ah \cdot m\Omega.$$

The present application further relates to an application of a current collector in a preparing process of a battery, wherein in the battery an interrupt in current only occurs in a point range, in case of short circuit caused by an abnormal situation, for safety.

The present application further relates to an application of a current collector used as a current collector in a battery, wherein in the battery an interrupt in current only occurs in a point range, in case of short circuit caused by an abnormal situation, for safety.

Preferably, the abnormal situation is nailing.

The technical solutions of the present application have at least advantages as follows:

The present application provides a current collector, which includes an insulation layer with a support function and a conductive layer with a conduction function and current collection function. A room temperature film resistance $R_S$ meets: $0.016\Omega/\square \leq R_S \leq 420\Omega/\square$. The current collector can greatly increase a short circuit resistance when in short circuit in case of an abnormal situation, make the short circuit current greatly decrease, so that a heat generated by the short circuit greatly decreases, and the safety performance of the battery is greatly improved. In addition, the heat generated is little, so that a heat generated at a position where the short circuit occurs can be fully absorbed by the battery, and the temperature rise of the battery caused is not significant. Thus, an influence of the short circuit damage on the battery is limited to a point range, and an interrupt in current only occurs in a point range, in case of short circuit caused by an abnormal situation, for safety, without disrupting the normal operation of the battery in a short period time.

Furthermore, the battery having the current collector can be damaged by a plurality of short circuit at a same time or in succession, however, no accidents, such as fire and explosion, may occur, and the battery can normally work in a short time.

REFERENCE SIGNS

1—positive electrode plate;
10—positive electrode current collector;
101—positive electrode insulation layer;
102—positive electrode conductive layer;
11—positive electrode active material layer;
2—negative electrode plate;
20—negative electrode current collector;
201—negative electrode insulation layer;
202—negative electrode conductive layer;
21—negative electrode active material layer;
3—separator;
4—nail.

DESCRIPTION OF EMBODIMENTS

The present application will be further illustrated with reference to the embodiments. It should be understood that, these embodiments are merely used to illustrate the present application, rather than limit the present application.

Figure 1:
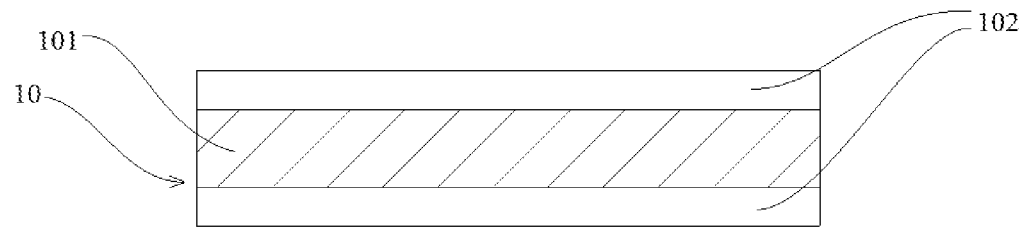
FIG. 1 is a structural schematic diagram of a positive current collector according to one embodiment of the present application.
Figure 2:
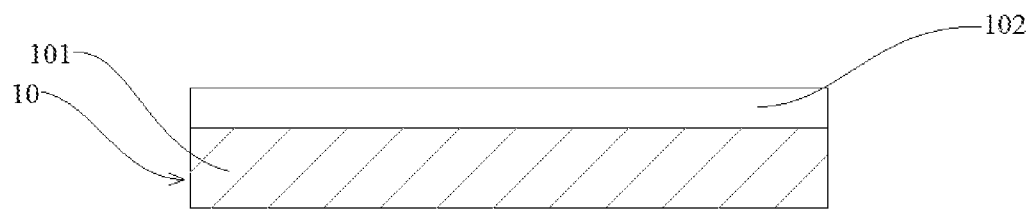
FIG. 2 is a structural schematic diagram of a positive current collector according to another embodiment of the present application.
Figure 3:
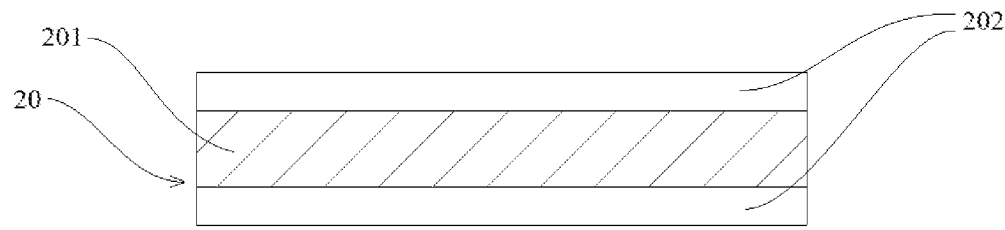
FIG. 3 is a structural schematic diagram of a negative current collector according to one embodiment of the present application.
Figure 4:
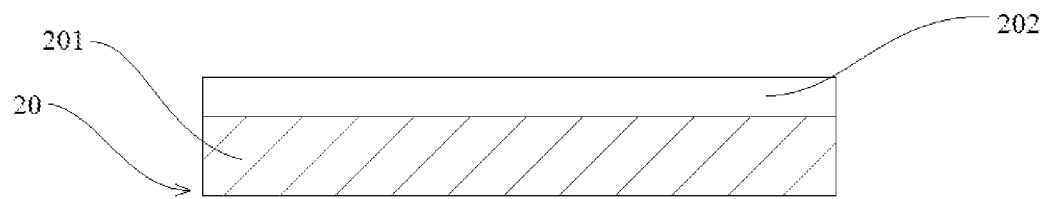
FIG. 4 is a structural schematic diagram of a negative current collector according to another embodiment of the present application.

Referring to FIGS. 1-4, the present application relates to a current collector including an insulation layer and a conductive layer. The insulation layer is used for supporting and protecting the conductive layer. The conductive layer is used for supporting an electrode active material layer, so as to provide electrons for the electrode active material layer. That is to say, the conductive layer is used for conduction and current collecting. The conductive layer is placed on at least one surface of the insulation layer. Referring to FIGS. 1 and 3, the conductive layer can be placed on two opposite surfaces of the insulation layer. Referring to FIGS. 2 and 4, the conductive layer can also be placed on only one surface of the insulation layer.

In the current collector, the room temperature film resistance $R_S$ of the conductive layer meets: $0.016\Omega/\square \leq R_S \leq 420\Omega/\square$, and the room temperature is 20° C.

The film resistance is calculated in ohms/square ($\Omega/\square$), and can be applied where the conductor is considered as a 2D system of a 2D entity, which is equivalent to the resistivity used in a 3D system. When a concept of film resistance is used, it is assumed that the current flows along a plane of the film theoretically.

For a conventional 3D conductor, a calculation formula of the resistance is:

$$R = \rho \frac{L}{A},$$

wherein $\rho$ refers to the resistivity, A refers to the cross-sectional area, and L refers to the length. The cross-sectional area can be equal to a product of the width W and the film thickness t. That is to say, the resistance can be calculated as:

$$R = \frac{\rho}{t} \frac{L}{W} = R_s \frac{L}{W}$$

wherein $R_S$ refers to the film resistance. When the film plate is square and L=W, the resistance R as tested is the film resistance $R_S$, and $R_S$ has no relation with the value of L or W. $R_S$ is the resistance per square, so that a unit of $R_S$ can be expressed as ohms per square ($\Omega/\square$).

The room temperature film resistance of the present application refers to a resistance of the conductive layer measured by a four-probe method at the room temperature.

In a Li-ion battery existing in the art, when the short circuit occurs in the battery in abnormal circumstances, great current is generated in a moment with a lot of heat generated by the short circuit. The heat causes a thermit reaction on a positive electrode aluminum foil current collector, and then causes fire and explosion on the battery.

In the present application, by increasing the room temperature film resistance $R_S$ of the current collector, the above mentioned technical problems is solved.

The internal resistance of the battery usually includes the battery ohmic resistance and the battery polarization resistance, wherein the resistance of the active material, the resistance of the current collector, the interface resistance, and the composition of the electrolyte may significantly influence the internal resistance of the battery.

When the short circuit occurs in case of an abnormal situation, the internal short circuit occurs, so that the internal resistance of the battery decreases greatly. Thus, if the resistance of the current collector increases, the internal resistance may increase after the short circuit of the battery, so that the safety performance of the battery is improved. In the present application, the influence of the short circuit on the battery is limited into a point range, which means that the influence of the short circuit on the battery is limited only at a damage point. Additionally, because of the high resistance of the current collector, the current of the short circuit decreases greatly, so that the temperature rise of the battery caused by the heat generated by the short circuit is not significant, without interrupting the regular work of the battery in a short period of time. The above described characters refer to an interrupt in current only occurring in a point range, in case of short circuit caused by an abnormal situation, for safety.

When the room temperature film resistance $R_S$ of the conductive layer is no less than $0.016\Omega/\square$, the current of the short circuit decreases greatly when the short circuit occurs in the battery, which can greatly reduce the heat generated by the short circuit, and thus significantly improves the safety performance of the battery. In addition, the heat generated by the short circuit can be controlled in a range which can be totally absorbed by the battery, so that the heat generated on the point where the short circuit occurs can be totally absorbed by the battery, and the temperature rise of the battery caused by the short circuit is small. Thus, the influence of the short circuit on the battery is limited to the point range, i.e., to only interrupt the current in a point range, without interrupting the regular operation of the battery in a short period of time.

However, when the room temperature film resistance $R_S$ of the conductive layer is too great, the function of conduction and current collecting of the conductive layer may be influenced, and electron can't be effectively conducted among the current collector, the electrode active material layer, and interfaces of the current collector and the electrode active material layer, which means that the polarization of the electrode active material layer on the surface of the conductive layer will be increased, influencing the electrochemical performance of the battery. Thus, the room temperature film resistance $R_S$ of the conductive layer is controlled to be not greater than $420\Omega/\square$.

In the present application, an upper limit of the room temperature film resistance $R_S$ can be $420\Omega/\square$, $400\Omega/\square$, $350\Omega/\square$, $300\Omega/\square$, $250\Omega/\square$, $200\Omega/\square$, $150\Omega/\square$, $100\Omega/\square$, $80\Omega/\square$, $60\Omega/\square$, $40\Omega/\square$, $25\Omega/\square$, $20\Omega/\square$, $18\Omega/\square$, $16\Omega/\square$, $14\Omega/\square$, $12\Omega/\square$, $10\Omega/\square$, $8\Omega/\square$, $6\Omega/\square$, $4\Omega/\square$, $2\Omega/\square$, or $1.8\Omega/\square$. A lower limit of the room temperature film resistance $R_S$ can be $0.016\Omega/\square$, $0.032\Omega/\square$, $0.048\Omega/\square$, $0.064\Omega/\square$, $0.08\Omega/\square$, $0.09\Omega/\square$, $0.1\Omega/\square$, $0.2\Omega/\square$, $0.4\Omega/\square$, $0.6\Omega/\square$, $0.8\Omega/\square$, $1\Omega/\square$, $1.2\Omega/\square$, $1.4\Omega/\square$, or $1.6\Omega/\square$. A range of the room temperature film resistance $R_S$ can be defined by any one of the upper limits and any one of the lower limits.

As an improvement of the current collector of the present application, the room temperature film resistance of the conductive layer meets: $0.032\Omega/\square \leq R_S \leq 21\Omega/\square$, and more preferably, $0.080\Omega/\square \leq R_S \leq 8.4\Omega/\square$.

As an improvement of the current collector of the present application, a thickness D2 of the conductive layer meets: $1 \text{ nm} \leq D2 \leq 1 \text{ μm}$.

In the present application, an upper limit of the thickness D2 of the conductive layer can be 1 μm, 900 nm, 800 nm, 700 nm, 600 nm, 500 nm, 450 nm, 400 nm, 350 nm, 300 nm, 250 nm, 200 nm, 150 nm, 120 nm, 100 nm, 80 nm or 60 nm, and a lower limit of the thickness D2 of the conductive layer can be 1 nm, 5 nm, 10 nm, 15 nm, 20 nm, 25 nm, 30 nm, 35 nm, 40 nm, 45 nm, 50 nm or 55 nm. A range of the thickness D2 of the conductive layer can be defined by any one of the upper limits and any one of the lower limits.

As an improvement of the current collector of the present application, the thickness D2 of the conductive layer meets: 20 nm≤D2≤500 nm, and more preferably, 50 nm≤D2≤200 nm.

If the conductive layer is too thin, it is good for increasing the room temperature film resistance $R_S$ of the current collector, but the conductive layer will be easily broken in a machining process of the electrode plate. If the conductive layer is too thick, the energy density of the battery will be influenced, and it is not good for increasing the room temperature film resistance $R_S$ of the conductive layer.

As an improvement of the current collector, a thickness of the insulation layer is referred to as D1, and D1 meets: 1 μm≤D1≤50 μm.

In the present application, an upper limit of the thickness D1 of the insulation layer can be 50 μm, 45 μm, 40 μm, 35 μm, 30 μm, 25 μm, 20 μm, 15 μm, 12 μm, 10 μm or 8 μm, and a lower limit of the thickness D1 of the insulation layer can be 1 μm, 1.5 μm, 2 μm, 3 μm, 4 μm, 5 μm, 6 μm or 7 μm. A range of the thickness D1 of the insulation layer can be defined by any one of the upper limits and any one of the lower limits.

As an improvement of the current collector of the present application, D1 meets: 2 μm≤D1≤30 μm, and more preferably, 5 μm≤D1≤20 μm.

The main function of the insulation layer is to support and protect the conductive layer. If the insulation layer is too thin, the insulation layer will be easily broken in the machining process of the electrode plate. If the insulation layer is too thick, the volumetric energy density of the battery, which uses the current collector, will decrease.

As an improvement of the current collector of the present application, the conductive layer is made of a material selected from a group consisting of a metal conductive material, a carbon-based conductive material and combinations thereof.

The metal conductive material is selected from a group consisting of aluminum, copper, nickel, titanium, silver, nickel-copper alloy, aluminum-zirconium alloy and combinations thereof. The carbon-based conductive material is selected from a group consisting of graphite, acetylene black, graphene, carbon nanotube and combinations thereof.

As an improvement of the current collector of the present application, the insulation layer is made of an organic polymer insulation material, an inorganic insulation material or a composite material. More preferably, the composite material consists of the organic polymer insulation material and the inorganic insulation material.

As an improvement of the current collector of the present application, the organic polymer insulation material is selected from a group consisting of polyamide (abbreviated as PA), polyethylene terephthalate (abbreviated as PET), polyimide (abbreviated as PI), polyethylene (abbreviated as PE), polypropylene (abbreviated as PP), polystyrene (abbreviated as PS), polyvinyl chloride (abbreviated as PVC), acrylonitrile butadiene styrene copolymers (abbreviated as ABS), polybutylene terephthalate (abbreviated as PBT), poly-p-phenylene terephthamide (abbreviated as PPA), epoxy resin, polyphenylene ether (abbreviated as PPE), polyformaldehyde (abbreviated as POM), phenol-formaldehyde resin, polytetrafluoroethylene (abbreviated as PTFE), silicone rubber, polyvinylidene fluoride (abbreviated as PVDF), polycarbonate (abbreviated as PC) and combinations thereof.

The inorganic insulation material is preferably selected from a group consisting of aluminum oxide ($Al_2O_3$), silicon carbide (SiC), silicon dioxide ($SiO_2$) and combinations thereof.

The composite material is preferably selected from a group consisting of epoxy resin fiberglass reinforced composite, polyester resin fiberglass reinforced composite and combinations thereof.

Since a density of the insulation layer is generally smaller than a metal density, the current collector of the present application can improve the safety performance of the battery, and meanwhile, also can improve the weight energy density of the battery. In addition, since the insulation layer can well support and protect the conductive layer on its surface, a fracture of the electrode plate, which easily occurs in a conventional current collector, won't easily occur in the current collector of the present application.

As an improvement of the current collector of the present application, a method for forming the conductive layer on the insulation layer is selected from a group consisting of mechanical rolling method, adhesive bonding, vapor deposition method, electroless plating method and combinations thereof. The vapor deposition method is preferably a physical vapor deposition method. The physical vapor deposition method is preferably selected from a group consisting of an evaporation method, a sputtering method and combinations thereof. The evaporation method is preferably selected from a group consisting of a vacuum evaporating method, a thermal evaporation deposition method, an electron beam evaporation method and combinations thereof. The sputtering method is preferably a magnetron sputtering method.

As an improvement of the current collector of the present application, for facilitating the electrolyte to permeate into the electrode active material layer and decreasing the polarization of the battery, a structure of the current collector is further improved. For example, a hole can be defined in the conductive layer, a diameter of the hole is in a range of 10 μm-100 μm, and a ratio of an open area of the hole to a whole surface area of the conductive layer is in a range of 5%-50%; or a through hole is defined in the current collector through the insulation layer and the conductive layer, a diameter of the through hole is in a range of 10 μm-100 μm, and a porosity of the current collector is in a range of 5%-50%. Specifically, an electroless plating method can be used to define the hole in the conductive layer, and a mechanical perforating method can be used to define the through hole through the insulation layer and the conductive layer of the current collector.

The present application further relates to an electrode plate, and the electrode plate includes the current collector of the present application and the electrode active material layer formed on the surface of the current collector.

When the electrode plate refers to a positive electrode plate 1, the positive electrode plate 1 includes a positive electrode current collector 10 of the present application and a positive electrode active material layer 11 formed on a surface of the positive electrode current collector 10, wherein the positive electrode current collector 10 includes a positive electrode insulation layer 101 and a positive electrode conductive layer 102. A structural schematic diagram of the positive electrode current collector is shown in FIGS. 1 and 2, and a structural schematic diagram of the positive electrode plate is shown in FIGS. 5 and 6.

When the electrode plate refers to a negative electrode plate 2, the negative electrode plate 2 includes a negative electrode current collector 20 of the present application and a negative electrode active material layer 21 formed on a surface of the negative electrode current collector 20, wherein the negative electrode current collector 20 includes a negative electrode insulation layer 201 and a negative electrode conductive layer 202. A structural schematic diagram of the negative electrode current collector is shown in FIGS. 3 and 4, and a structural schematic diagram of the negative electrode plate is shown in FIGS. 7 and 8.

Figure 5:
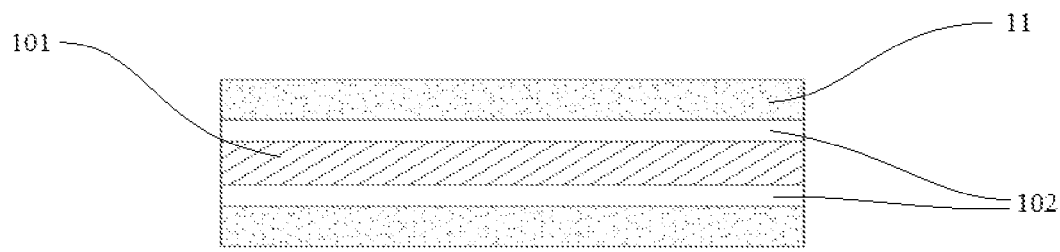
FIG. 5 is a structural schematic diagram of a positive electrode plate according to one embodiment of the present application.
Figure 7:
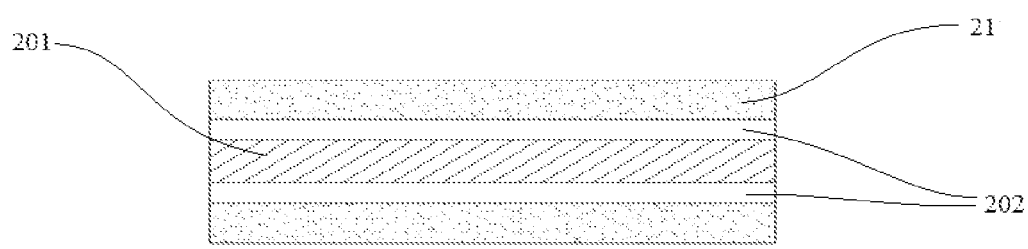
FIG. 7 is a structural schematic diagram of a negative electrode plate according to one embodiment of the present application.

As shown in FIGS. 1 and 3, when the conductive layer is placed on two opposite surfaces of the insulation layer, the active material is coated on two opposite surfaces of the current collector, and the electrode plates prepared are shown in FIGS. 5 and 7, which can be directly used in the batteries.

Figure 6:
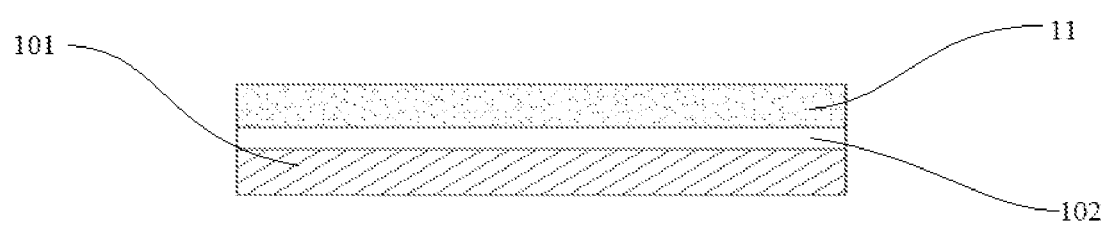
FIG. 6 is a structural schematic diagram of a positive electrode plate according to another embodiment of the present application.
Figure 8:
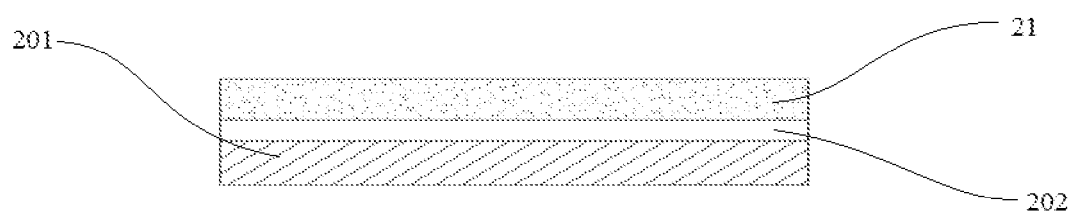
FIG. 8 is a structural schematic diagram of a negative electrode plate according to another embodiment of the present application.

As shown in FIGS. 2 and 4, when the conductive layer is placed on only one surface of the insulation layer, the active material is coated on only one surface of the current collector, and the electrode plates prepared are shown in FIGS. 6 and 8, which can be used in the batteries after folding.

The present application further relates to a battery. The battery includes a positive electrode plate, a separator, and a negative electrode plate.

The positive electrode and/or the negative electrode plate are the electrode plates of the present application. The battery of the present application can be in winding type or in stacked type. The battery of the present application can be a Li-ion secondary battery, a Li primary battery, a Na-ion battery or a Mg-ion battery, but not limited herein.

Preferably, the positive electrode plate of the battery of the application uses the above-mentioned electrode plate of the present application. Since the Al content of the conventional positive electrode current collector is high, when the short circuit occurs in an abnormal situation, the heat generated on the position where the short circuit occurs can cause a violent thermit reaction, generating a lot of heat and causing accidents, such as explosion of the battery. Therefore, when the positive electrode plate of the battery uses the electrode plate of the present application, because the Al content of the positive electrode current collector with only a nano-sized thickness decreases greatly, so that the thermit reaction can be avoided, and the safety performance of the battery can be improved significantly.

Figure 9:
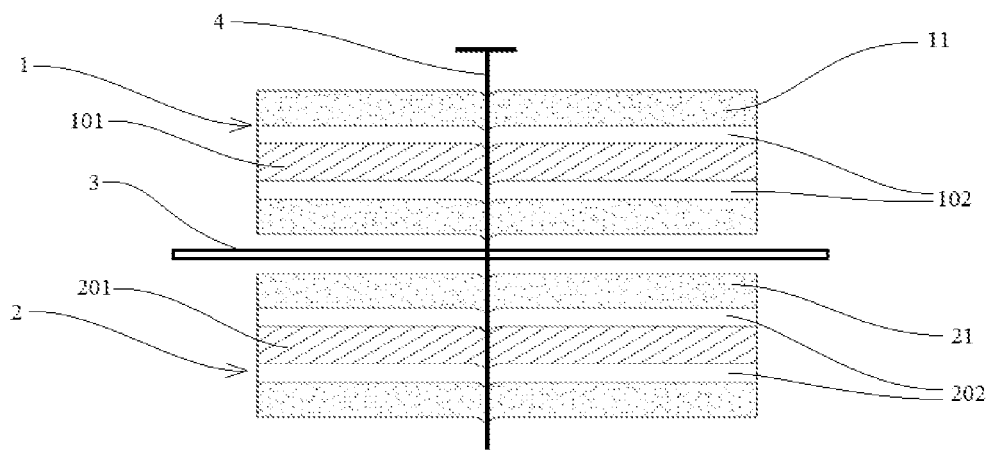
FIG. 9 is a schematic diagram of a one-time nailing test of the present application.

A nailing test is used to simulate the abnormal situation of the battery, and a change of the battery after nailing is investigated. FIG. 9 is a schematic diagram of a one-time nailing test of the present application. For simplicity, FIG. 9 only shows that the nail 4 penetrates through one layer of the positive electrode plate 1 of the battery, one layer of the separator 3 of the battery, and one layer of the negative electrode plate 2 of the battery. It should be interpreted that in the actual nailing test, the nail 4 penetrates through the whole battery, which usually includes multiple layers of the positive electrode plate 1, multiple layers of the separator 3, and multiple layers of the negative electrode plate 2.

Additionally, in the present application, it is investigated by a lot of experiments that the greater the battery capacity, the smaller the internal resistance of the battery, and the poorer the safety performance of the battery. That is to say, the battery capacity (Cap) is in inverse proportion to the internal resistance (r) of the battery:

$$r = A/\text{Cap}$$

wherein r refers to the internal resistance of the battery, Cap refers to the battery capacity, and A refers to a coefficient.

The battery capacity (Cap) is the theoretical capacity of the battery, and usually is the theoretical capacity of the positive electrode plate of the battery.

r can be measured by an internal resistance meter.

For a conventional Li-ion battery including a conventional positive electrode plate and a conventional negative electrode plate, when the short circuit occurs in case of an abnormal situation, basically, various degree of smoking, fire and explosion occurs in all the conventional Li-ion batteries.

For the battery of the present application, since in case of having a same battery capacity, the internal resistance of the battery is relatively great, the value of A can be relatively great.

For the battery of the present application, when the coefficient A meets $40\ \text{Ah·m}\Omega \leq A \leq 2000\ \text{Ah·m}\Omega$, the battery has both a good electrochemical performance and a good safety performance.

When the value of A is too great, the internal resistance of the battery will be too great, and the electrochemical performance becomes poor, so that the battery has no practicability.

When the value of A is too small, the temperature rises when the short circuit occurs in the battery, and the safety performance of the battery becomes poor.

Preferably, A meets $40\ \text{Ah·m}\Omega \leq A \leq 1000\ \text{Ah·m}\Omega$; and more preferably, A meets $60\ \text{Ah·m}\Omega \leq A \leq 600\ \text{Ah·m}\Omega$.

The present application further relates to an application of the current collector in a preparing process of a battery, in which an interrupt in current only occurs in a point range when in case of short circuit caused by an abnormal situation to protect itself. In the present application, the character that the influence of the short circuit on the battery is limited to a point range without interrupting the regular work of the battery in a short period of time, refers to an interrupt in current only occurring in a point range in case of short circuit caused by an abnormal situation, for safety.

In another aspect, the present application further relates to an application of the current collector as a current collector in a battery, in which an interrupt in current only occurs in a point range in case of short circuit caused by an abnormal situation, for safety.

The abnormal situation causing the short circuit includes collision, squeezing, foreign matter penetration and so on. Since the short circuit is generally caused by electrically connecting the positive electrode to the negative electrode by a conductive material in those damage processes, in the present application, the abnormal situation is collectively called as the nail penetration. Furthermore, in the embodiment of the present application, the nailing test is used to simulate the abnormal situation of the battery.

Embodiments

1. Preparation of the Current Collector

An insulation layer with a certain thickness is selected. A conductive layer with a certain thickness is formed on the surface of the insulation layer by the vacuum evaporating method, the mechanical rolling method or adhesive bonding, and the room temperature film resistance of the conductive layer is measured.

Wherein, (1) conditions of the vacuum evaporating method are as follows: the insulation layer after surface cleaning is placed in a vacuum plating room, a metal wire with a high purity in a metal evaporation chamber is melted and evaporated at a high temperature in a range of 1600° C.-2000° C., the metal evaporated passes through a cooling system in the vacuum plating room and finally deposits on the surface of the insulation layer to form the conductive layer.

(2) conditions of the mechanical rolling method are as follows: a foil of a conductive material is placed in a mechanical roller, is rolled to a pre-determined thickness under a pressure in a range of 20t-40t, and then is placed on a surface of the insulation layer after surface cleaning. Finally, the insulation layer together with the foil of the conductive material is placed in the mechanical roller, and then the two closely attached to each other under a pressure in a range of 30t-50t.

(3) conditions of adhesive bonding are as follows: a foil of a conductive material is placed in a mechanical roller, and is rolled to form a conductive layer with a pre-determined thickness under a pressure in a range of 20t-40t. A mixture solution of PVDF and NMP is coated on a surface of an insulation layer after surface cleaning. Finally, the conductive layer with the pre-determined thickness is adhered to the surface of the insulation layer, and dried at a temperature of 100° C.

(4) a test method of the room temperature film resistance is as follows:

A RTS-9 double electric four-probe tester is used, and the testing environment is: room temperature 23° C.±2° C., and the relative humidity≤65%. When testing, a surface of a to-be-tested material is cleaned and horizontally placed on a test bed, the four probes are laid down to contact well with the surface of the to-be-tested material, a current range of the material is calibrated in an auto testing mode, the film resistance is tested at a proper current range, and 8-10 data points of a same sample are collected for accuracy analysis and error analysis of data measurement.

The detailed parameters of the current collectors and the electrode plates in the embodiments of the present application are listed in Table 1, and the detailed parameters of the current collectors and the electrode plates in the comparative examples are listed in Table 2.

2. Preparation of the Electrode Plate

By a conventional coating method for a battery, a positive electrode slurry or a negative electrode slurry is coated on the surface of the current collector, and after drying at a temperature of 100° C., the positive electrode plate or the negative electrode plate is obtained.

Conventional positive electrode plate: the current collector is an Al foil with a thickness of 12 μm, and the electrode active material layer is a ternary material layer (lithium-nickel-cobalt-manganese composite oxide, abbreviated as NCM) with a certain thickness.

Conventional negative electrode plate: the current collector is a Cu foil with a thickness of 8 μm, and the electrode active material layer is a graphite material layer with a certain thickness.

The detailed parameters of the current collectors and the electrode plates in the embodiments of the present application are listed in Table 1, and the detailed parameters of the current collectors and the electrode plates in the comparative examples are listed in Table 2.

Preparation of the Battery

By a conventional preparation process for the battery, a positive electrode plate (the compaction density: 3.4 g/cm$^3$), a PP/PE/PP separator and a negative electrode plate (the compaction density: 1.6 g/cm$^3$) are together wound into a bare cell, and then placed in a case for the battery. Then, the electrolyte (a volume ratio of ethyl carbonate (EC):ethyl methyl carbonate (EMC) is 3:7, and a molar concentration of LiPF$_6$ is 1 mol/L) is injected. Subsequently, sealing and forming are performed, and finally the Li-ion battery is obtained.

Detailed compositions of the Li-ion batteries prepared in the embodiments of the present application and in the comparative examples are listed in Table 1.

TABLE 1

| Electrode plate No. | Insulation layer | | Conductive layer | | preparation method | $R_s$ (Ω/□) | Electrode active material layer | |
|---|---|---|---|---|---|---|---|---|
| | material | D1 | material | D2 | | | material | thickness |
| Electrode plate 1# | PI | 1 μm | Ti | 1 nm | Vacuum evaporating | 420 | LCO | 55 μm |
| Electrode plate 2# | PET | 5 μm | Al | 30 nm | Vacuum evaporating | 0.94 | LCO | 55 μm |
| Electrode plate 3# | PI | 9 μm | Al | 200 nm | Vacuum evaporating | 0.14 | NCM | 55 μm |
| Electrode plate 4# | PI | 30 μm | Ag | 1000 nm | Mechanical rolling | 0.016 | NCM | 55 μm |
| Electrode plate 5# | PI | 2 μm | Cu | 5 nm | Vacuum evaporating | 3.36 | graphite | 70 μm |
| Electrode plate 6# | PI | 5 μm | Cu | 20 nm | Vacuum evaporating | 0.84 | graphite | 70 μm |
| Electrode plate 7# | PET | 8 μm | Ni | 160 nm | Vacuum evaporating | 0.44 | graphite | 70 μm |
| Electrode plate 8# | PET | 20 μm | Al | 500 nm | Vacuum evaporating | 0.034 | NCM | 55 μm |

Note:
LCO in the present application refers to lithium cobalt oxide.

TABLE 2

| Electrode plate No. | Insulation layer material | D1 | Conductive layer material | D2 | preparation method | $R_s$ ($\Omega/\square$) | Electrode active material layer material | thickness |
|---|---|---|---|---|---|---|---|---|
| Electrode plate 1# of comparative example | PI | 9 μm | Al | 2000 nm | adhesive bonding | 0.014 | LCO | 55 μm |
| Electrode plate 2# of comparative example | PET | 20 μm | Cu | 1200 nm | Mechanical rolling | 0.014 | graphite | 70 μm |

TABLE 3

| Li-ion battery No. | Electrode plate composition | | Cap (Ah) |
|---|---|---|---|
| Li-ion battery 1# | Conventional positive electrode plate | Conventional negative electrode plate | 3.2 |
| Li-ion battery 2# | Electrode plate 1# | Conventional negative electrode plate | 3.2 |
| Li-ion battery 3# | Electrode plate 2# | Conventional negative electrode plate | 3.2 |
| Li-ion battery 4# | Electrode plate 3# | Conventional negative electrode plate | 3.2 |
| Li-ion battery 5# | Electrode plate 4# | Conventional negative electrode plate | 3.2 |
| Li-ion battery 6# | Electrode plate 1# of comparative example | Conventional negative electrode plate | 3.2 |
| Li-ion battery 7# | Conventional positive electrode plate | Electrode plate 5# | 3.2 |
| Li-ion battery 8# | Conventional positive electrode plate | Electrode plate 6# | 3.2 |
| Li-ion battery 9# | Conventional positive electrode plate | Electrode plate 7# | 3.2 |
| Li-ion battery 10# | Electrode plate 8# | Conventional negative electrode plate | 3.2 |
| Li-ion battery 11# | Conventional positive electrode plate | Electrode plate 2# of comparative example | 3.2 |
| Li-ion battery 12# | Electrode plate 2# | Electrode plate 7# | 3.2 |
| Li-ion battery 13# | Electrode plate 3# | Electrode plate 6# | 3.2 |
| Li-ion battery 14# | Electrode plate 3# | Conventional negative electrode plate | 10.5 |
| Li-ion battery 15# | Electrode plate 3# | Conventional negative electrode plate | 48 |

By further increasing winding layers of the cell, Li-ion battery 14# and Li-ion battery 15# are prepared with further improved capacity.

EXPERIMENTAL EXAMPLES

1. Testing Method for the Battery

The cycling life of the Li-ion battery is tested, and the detailed test method is as follows:

Each of Li-ion battery 1# and Li-ion battery 4# is charged and discharged at 25° C. and 45° C., that is to say, the battery is charged to 4.2V under a current of 1 C, and then discharged to 2.8V under a current of 1 C, and a discharge capacity at the first cycle is recorded; in such manner, the battery is charged and discharged for 1000 cycles, a discharge capacity at the 1000$^{th}$ cycle is recorded, then a capacity retention ratio at the 1000$^{th}$ cycle is obtained by dividing the discharge capacity at the 1000$^{th}$ cycle by the discharge capacity at the first cycle.

Experimental results are listed in Table 4.

Test of the Internal Resistance of the Battery

By an internal resistance meter (model: HIOKI-BT3562), the internal resistance is tested, and the test environment is as follow: a room temperature of 23±2° C. Before testing, the internal resistance meter is calibrated to zero resistance by connecting a positive electrode of the inner resistance meter with a negative electrode of the inner resistance meter for short circuit. When testing, the positive electrode tab and the negative electrode tab of the to-be-tested Li-ion battery are cleaned. Then, testing ends (i.e., the positive and negative electrodes) of the internal resistance meter are respectively connected with the positive electrode tab and the negative electrode tab of the to-be-tested Li-ion battery, the testing is performed, and resistance of the to-be-tested Li-ion battery is recorded. Coefficient A is calculated by the formula of r=A/Cap.

Experimental methods and testing methods of one-time nailing test and six-time successive nailing test are as follows:

(1) one-time nailing test: after being fully charged, the battery is fixed, at a room temperature, a steel needle with a diameter of 8 mm penetrates through the battery at a speed of 25 mm/s, the steel needle is kept in the battery, and after finishing nailing, the battery is observed and tested.

(2) six-time nailing test: after being fully charged, the battery is fixed, at a room temperature, six steel needles with a diameter of 8 mm promptly and successively penetrate through the battery at a speed of 25 mm/s, the steel needles are kept in the battery, and after finishing nailing, the battery is observed and tested.

(3) test of the battery temperature: by a multichannel temperature data logger, temperature sensing wires are attached onto geometric centers of a penetrating surface and an opposite surface to the penetrating surface of a to-be-penetrated battery; after finishing nailing, the battery temperature are tracked and tested for 5 min, and then the battery temperature at the 5$^{th}$ min is recorded.

(4) test of the battery voltage: the positive and negative electrodes of the to-be-penetrated battery are connected with testing ends of the internal resistance meter. After finishing nailing, the battery voltage is tracked and tested for 5 min, and then the battery voltage at the 5$^{th}$ min is recorded.

The recorded data of the battery temperature and the battery voltage are listed in Table 5.

TABLE 4

| | Capacity retention ratio | |
|---|---|---|
| Li-ion battery No. | 25° C. | 45° C. |
| Li-ion battery 1# | 89.2% | 86.5% |
| Li-ion battery 4# | 88.0% | 86.2% |

TABLE 5

| Li-ion battery No. | one-time nailing test | | six-time successive nailing test | |
|---|---|---|---|---|
| | Temperature rise (° C.) | Battery voltage (V) | Temperature rise (° C.) | Battery voltage (V) |
| Li-ion battery 1# | 500 | 0 | N/A | N/A |
| Li-ion battery 2# | 2.1 | 4.25 | 3.7 | 4.25 |
| Li-ion battery 3# | 3.4 | 4.35 | 3.2 | 4.32 |
| Li-ion battery 4# | 3.5 | 4.15 | 4.1 | 4.14 |
| Li-ion battery 5# | 8.7 | 4.05 | 10.2 | 3.96 |
| Li-ion battery 6# | 270 | 0 | N/A | N/A |
| Li-ion battery 7# | 2.5 | 4.15 | 2.3 | 4.13 |
| Li-ion battery 8# | 2.3 | 4.16 | 4.0 | 4.06 |
| Li-ion battery 9# | 2.1 | 4.15 | 2.3 | 4.11 |
| Li-ion battery 10 | 8.0 | 4.03 | 11.2 | 3.95 |
| Li-ion battery 11# | 540 | 0 | N/A | N/A |
| Li-ion battery 12# | 2.7 | 4.30 | 3.5 | 4.29 |
| Li-ion battery 13# | 3.1 | 4.13 | 4.8 | 4.10 |

Note:
"N/A" refers to a situation that a thermal runaway and damage occur to the battery at a moment of the steel needle penetrating through the battery.

TABLE 6

| Li-ion battery No. | Cap (Ah) | r (mΩ) | Coefficient A | one-time nailing test Temperature rise (° C.) |
|---|---|---|---|---|
| Li-ion battery 4# | 3.2 | 40 | 128 | 3.5 |
| Li-ion battery 5# | 3.2 | 13 | 42 | 8.7 |
| Li-ion battery 14# | 10.5 | 12 | 126 | 3.8 |
| Li-ion battery 15# | 48 | 8 | 384 | 2.6 |
| Li-ion battery 6# | 3.2 | 10 | 32 | 270 |
| Li-ion battery 11# | 3.2 | 8.5 | 27 | 540 |

Figure 10:
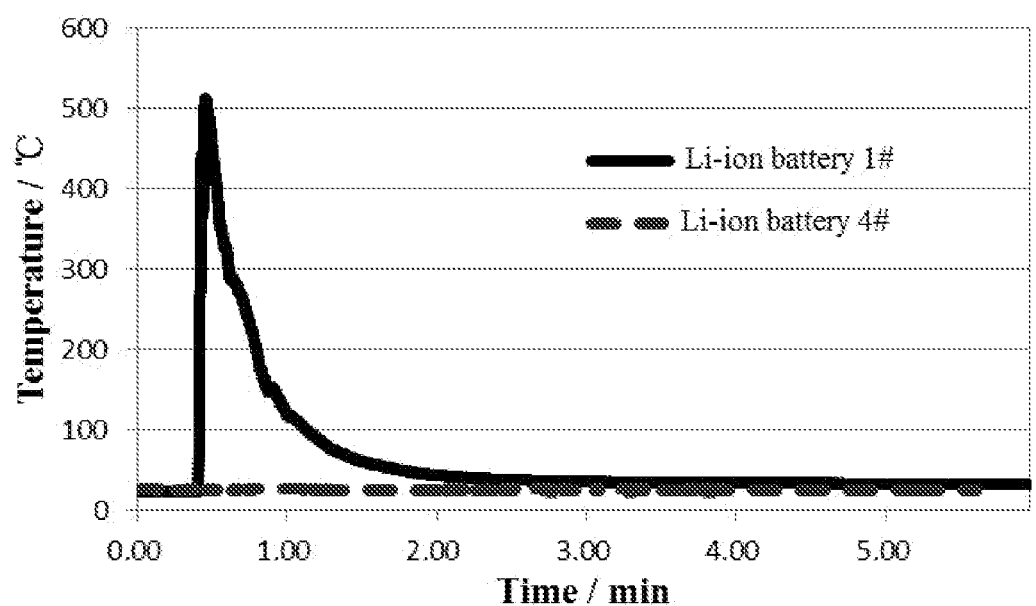
FIG. 10 is a diagram of curves showing temperature variation of Li-ion battery $1^\cap$ and Li-ion battery $4^\#$ after a one-time nailing test.
Figure 11:
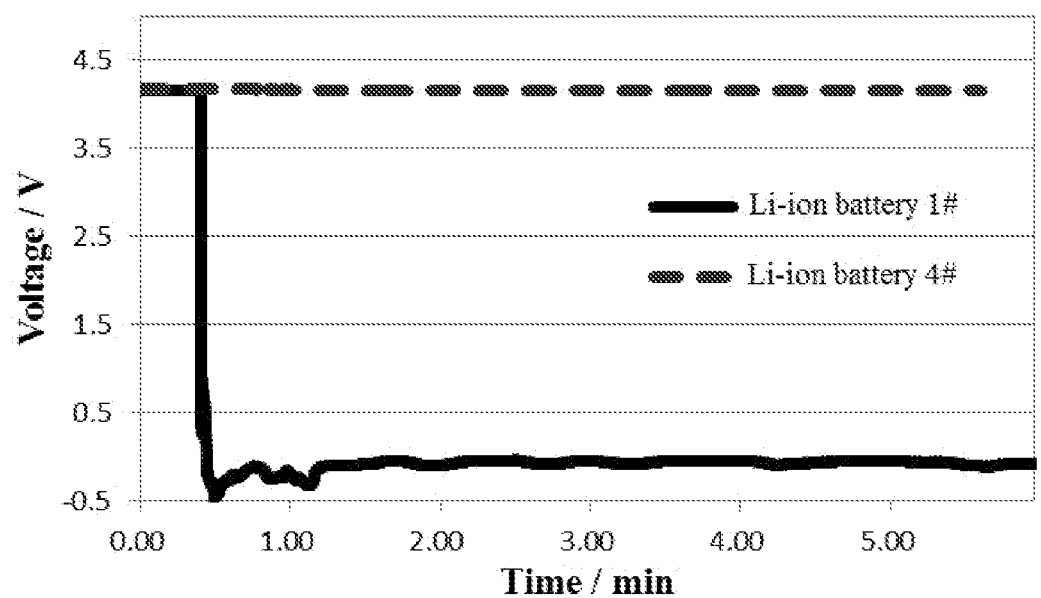
FIG. 11 is a diagram of curves showing voltage variation of Li-ion battery $1^\#$ and Li-ion battery $4^\#$ after a one-time nailing test.

The changes of temperatures of Li-ion battery 1# and 4# with respect to time are shown in FIG. 10, and the changes of voltages of Li-ion battery 1# and 4# with respect to time are shown in FIG. 11.

According to results in Table 4, compared with Li-ion battery 1# which uses the conventional positive and negative electrodes, Li-ion battery 4#, which uses the current collector in the embodiment of the present application, has a good cycle life comparable to the cycle life of the conventional battery. It is demonstrated that the current collector in the embodiment of the present application does not have any noticeable adverse influence on the electrode plate prepared and the battery prepared.

In addition, the current collector in the embodiment of the present application can greatly improve the safety performance of the Li-ion battery. According to results in Table 5, FIG. 10 and FIG. 11, for Li-ion batteries 1#, 6# and 11# without using of the current collector of the present application, at the moment of the steel needle penetrating through the battery, the battery temperature rises for several hundred degrees, and the battery voltage decreases to zero, which demonstrates that at the moment of the steel needle penetrating through the battery, the inner short circuit occurs in the battery generating a lot of heat, the thermal runaway and damage instantaneously occur in the battery, and the battery can't go on working; furthermore, at the moment of the steel needle penetrating through the battery, the thermal runaway and damage occur in the battery, so that the six-time successive nailing test cannot be performed for those batteries.

However, for Li-ion batteries 2#-5#, 7#-10#, 12# and 13# using the current collector in the embodiment of the present application, the temperature rises are substantially controlled at about 10° C. or below 10° C., the voltages keep stable, and the cells can work normally, whether the batteries are tested by one-time nailing test or by six-time successive nailing test.

Results in Table 6 shows that, for Li-ion batteries 6# and 11# without using the current collector in the embodiment of the present, the coefficient A is relatively small. However, for Li-ion batteries 4#, 5#, 14# and 15# using the current collector in the embodiment of the present, the coefficient A is relatively great. Thus, it is demonstrated that the greater the coefficient A, the smaller the temperature rise when the inner short circuit occurs in case of an abnormal situation, and then the better the safety performance of the battery.

Therefore, when the inner short circuit occurs to the battery, the current collector in the embodiment of the present application can greatly decrease the heat generated by the short circuit, so that the safety performance of the battery is improved. In addition, an influence of the short circuit damage on the battery can be limited to a point range, and an interrupt in current only occurs in a point range, without disrupting the normal operation of the battery in a short period of time.

The preferred embodiments of the present application are described above, however, these embodiment do not limit the claims of present application. For those skilled in the art, various changes and modifications can be made without departing from the invention concept of the present application, and the protection scope of the present application shall be defined by the claims of the present application.

What is claimed is:

1. A battery, comprising:
a positive electrode plate;
a separator; and
a negative electrode plate,
wherein the positive electrode plate and/or the negative electrode plate is an electrode comprising a current collector and an electrode active material layer formed on a surface of the current collector,
the current collector, comprising an insulation layer and a conductive layer,
the insulation layer being configured to bear the conductive layer, the conductive layer being configured to bear the electrode active material layer, and the conductive layer being placed on at least one surface of the insulation layer,
wherein the conductive layer has the following characteristics:
a room temperature film resistance RS of $0.08\Omega/\square \leq RS \leq 8.4\Omega/\square$, and a thickness D2 of $1\ nm \leq D2 \leq 1\ \mu m$, and
wherein the conductive layer is a single layer made of a material selected from a group consisting of aluminum, copper, titanium, nickel-copper alloy, aluminum-zirconium alloy, and combinations thereof, and
wherein an internal resistance of the battery is referred to as r, a theoretical capacity of the battery is referred to as Cap, a relation between r and Cap meets a conditional expression: $126\ Ah \cdot m\Omega \leq r \times Cap \leq 384\ Ah \cdot m\Omega$, and the theoretical capacity Cap satisfies $3.2\ Ah \leq Cap \leq 48\ Ah$.

2. The battery according to claim 1, wherein a thickness of the insulation layer is D1, and D1 meets a conditional expression: $1\ \mu m \leq D1 \leq 50\ \mu m$.

3. The battery according to claim 2, wherein D1 meets a conditional expression: $2\ \mu m \leq D1 \leq 30\ \mu m$.

4. The battery according to claim 2, wherein D1 meets a conditional expression: 5 μm≤D1≤20 μm.

5. The battery according to claim 1, wherein the insulation layer is made of a material selected from a group consisting of organic polymer insulation material, inorganic insulation material, composite material and combinations thereof;
the organic polymer insulation material is selected from a group consisting of polyamide, polyethylene terephthalate, polyimide, polyethylene, polypropylene, polystyrene, polyvinyl chloride, acrylonitrile butadiene styrene copolymers, polybutylene terephthalate, poly-pphenylene terephthamide, polyphenylene ether, polyformaldehyde, epoxy resin, phenolformaldehyde resin, polytetrafluoroethylene, polyvinylidene fluoride, silicone rubber, polycarbonate and combinations thereof;
the inorganic insulation material is selected from a group consisting of aluminum oxide, silicon carbide, silicon dioxide and combinations thereof; and
the composite material is selected from a group consisting of epoxy resin fiberglass reinforced composite, polyester resin fiberglass reinforced composite and combinations thereof.

6. The battery according to claim 1, wherein a hole is defined in the conductive layer, or a through hole is defined in the current collector penetrating through the insulation layer and the conductive layer.

7. The battery according to claim 1, wherein a method for forming the conductive layer on the insulation layer is selected from a group consisting of a mechanical rolling method, an adhesive bonding method, a vapor deposition method, an electroless plating method and combinations thereof.

8. The battery according to claim 7, wherein the vapor deposition method is a physical vapor deposition method;
the physical vapor deposition method is selected from a group consisting of a evaporation method, a sputtering method and combinations thereof,
the evaporation method is selected from a group consisting of a vacuum evaporating method, a thermal evaporation deposition method, an electron beam evaporation method and combinations thereof, and
the sputtering method is a magnetron sputtering method.

9. The battery according to claim 1, wherein the room temperature film resistance is measured at a room temperature of 23° C.±2° C. and a relative humidity≤65%.

10. The battery according to claim 9, wherein the room temperature film resistance is measured with a RTS-9 double electric four-probe tester during which a surface to be tested is cleaned and horizontally placed on a test bed, four probes contact with the surface, the room temperature film resistance is tested in a proper current range calibrated in an auto testing mode, and 8-10 data points of a same sample are collected for accuracy analysis and error analysis of data measurement.

* * * * *